HALOGENO-6-HYDROXY-PYRIDONE-(2) COMPOUNDS

Gert Hegar, Schonenbuch, and Henri Riat, Arlesheim, Switzerland, assignors to Ciba-Geigy AG, Basel, Switzerland
No Drawing. Filed Aug. 11, 1971, Ser. No. 170,963
Claims priority, application Switzerland, Aug. 19, 1970, 12,371/70
Int. Cl. C07d 31/42
U.S. Cl. 260—296 R     5 Claims

ABSTRACT OF THE DISCLOSURE 3-halogeno-6-hydroxy-pyridone - (2) compounds and process for their manufacture by halogenating the corresponding 6-hydroxy-pyridone-(2) compounds. Valuable starting compounds for the manufacture of dyestuffs.

---

The invention relates to halogeno-6-hydroxy-pyridone-(2) compounds, especially those which possess a halogen atom, for example a chlorine, bromine or fluorine atom, in the 3-position of the pyridine ring. Among the compounds according to the invention, particularly interest attaches to those which correspond to the formula

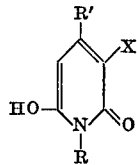

(1)

in which R and R' each represent a hydrogen atom, an alkyl or aryl radical or a heterocyclic radical and X represents a halogen atom.

The halogeno-6-hydroxy-pyridone-(2) compounds may exist in several tautomeric forms; but in order to simplify the description, the compounds are illustrated in the formulae in only on of these tautomeric forms. However, it must be distinctly emphasised that the description both here and in what follows, particularly in the claims, always refers to compounds in any one of these tautomeric forms.

In particular, the term "pyridone" is intended to include both the compounds in question which are substituted at the nitrogen atom of the pyridone ring by a hydrogen atom and the corresponding tautomeric 2,6-dihydroxypyridines.

The 3-halogeno-6-hydroxy-pyridone-(2) compounds of the General Formula 1 may be substituted in the radicals R and R' by other atoms or groups of atoms, for example by halogen atoms, hydroxy, amino, alkyl, aryl, alkoxy, aryloxy, acylamino, cyano, acyl, carbalkoxy, acyloxy or nitro groups.

A special group of compounds according to the invention are those of the Formula 1, in which R and R' represent hydrogen atoms or alkyl radicals with at most 4 carbon atoms, especially methyl or ethyl radicals.

Another group of compounds according to the invention to which interest attaches for the use stated hereinbelow in the manufacture of dyestuffs, has the general formula

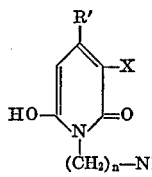

(2)

in which R' represents an alkyl or aryl radicals, X represents a halogen atom and $n$ is a positive integer, preferably between 1 and 4. Here too of particular importance are those compounds in which R' represents a lower molecular alkyl radical, especially a methyl radical.

The 3-halogeno-6-hydroxy-pyridone-(2) compounds are manufactured by reacting unsubstituted pyridones in the 3-position, especially those of the formula

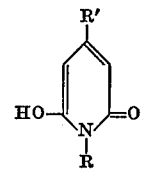

(3)

in which R and R' each represent a hydrogen atom, an alkyl or aryl radical or a heterocyclic radical, with halogenating agents such, for example, as sulphenyl chloride or elemental chlorine or bromine in organic or aqueous acid solution, optionally in "statu nascendi," or with alkali hypochlorites in aqueous alkaline solution. In order to obtain unitary reaction products, it is also advantageous to use as starting materials pyridones which contain a removable substituent in the 5-position of the pyridione ring, for example a —CN, —COOR or —CONH₂ group, and to remove this upon completion of halogenation, for example by saponification. By means of halogen exchange, for example by heating a 3-chloro-pyridone or 3-bromo-pyridone with an alkali fluoride in dipolar aprotic solvents, it is also possible to manufacture the corresponding 3-fluoro-pyridines.

The compounds according to the invention are new. They are particularly suitable as starting compounds for the manufacture of dyestuffs. Thus, in particular, compounds of the Formula 1 can be easily coupled with diazo components to give dyestuffs of the general formula

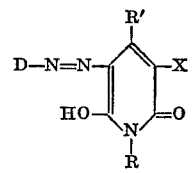

(4)

in which R, R' and X have the meanings given above and D represents the radical of a diazo component, especially of a diazo component of the benzene or naphthalene series. Of particular importance are dyestuffs of the Formula 4, which contain a water-solubilising group, for example a sulphonic acid group, and furthermore contain a reactive radical or a free acylatable amino group respectively, either in the diazo or in the pyridione coupling component, so that the dyestuffs of the Formula 4 or the 3-halogeno-6-hydroxy pyridone-(2) starting compounds respectively, such, for example, as those of the Formula 2, can be converted with a halide or anhydride of an acyl component containing a reactive radical into fibre reactive compounds.

The dyestuffs of the Formula 4 are distinguished by great tinctorial strength. The dyeings obtained therewith exhibit brilliant pure yellow shades with good fastness properties. In comparison with the already known dyestuffs of the Formula 4, which in the 3-position of the pyridine ring contain a cyano group instead of a halogen atom, the azo dyestuffs obtainable with the coupling components of the Formula 1 are distinguished by better resistance to acid and alkali.

The following examples illustrate the invention. Unless otherwise stated, the parts and percentages are by weight, and the relationship of parts by weight to parts by volume is the same as that of the gram to the cubic centimetre.

EXAMPLE 1

178 parts of 1-ethyl-3-cyano-4-methyl-6-hydroxy-pyridone-(2) are dissolved in a mixture of 1000 g. of ice and 100 parts of a 40% aqueous sodium hydroxide solution. 1000 parts by volume of commercial sodium hypochlorite are rapidly run into this mixture and in the course of the ensuing gently exothermic reaction, a crystalline product quickly precipitates. This product is filtered with suction, dissolved again in 1000 parts of water and the solution strongly acidified by addition of 200 parts of concentrated hydrochloric acid. The isolated product corresponds to the formula

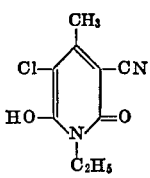

200 parts of this intermediate product are introduced into a mixture of 400 parts by volume of 98% sulphuric acid and 200 parts of water. The batch is stirred for 3 hours at 130° C. and upon cooling, diluted with 1600 parts of water and the resulting 1-ethyl-3-chloro-4-methyl-6-hydroxy-pyridone-(2) is collected by suction filtration.

The obtained product has a melting point of 143–144° C. A quantitative analysis yields the following values:

Calculated (percent): C, 51.21; H, 5.37; N, 7.47; Cl, 18.9. Found (percent): C, 51.34; H, 5.57; N, 7.56; Cl, 18.80.

According to the data of this example, the corresponding 3-chloro compound is obtained from 1-methyl-3-cyano-4-methyl-6-hydroxy-pyridone-(2) and 3 - chloro-4-methyl-2,6-dihydroxypyridine from 3-cyano-4-methyl-2,6-dihydroxy-pyridine.

EXAMPLE 2

19.2 parts of 1 - propyl-3-cyano-4-methyl-6-hydroxy-pyridine-(2) are suspended in 300 parts of chloroform, when partial solution occurs. 16 parts of bromine are added dropwise within 1 hour while cooling with ice. When all the bromine has been added, the mixture is stirred for 1 hour at 5–10° C. and the colourless precipitate that forms is collected by suction filtration. By means of saponifying decraboxylation in accordance with Example 1, 1-propyl-3-bromo-4-methyl-6-hydroxy-pyridone-(2) is obtained.

EXAMPLE 3

39.2 parts of 1 - ethyl-3-aminocarbonyl-4-methyl-6-hydroxy-pyridone-2 are suspended in 200 parts of water and dissolved by addition of 30% sodium hydroxide solution at pH 10. 400 parts by volume of sodium hypochlorite solution are added to this solution at 15° C. within 20 minutes and with gentle external cooling. After stirring the solution for 1 hour, 100 parts of sodium chloride and 100 parts of potassium chloride are added and the resulting precipitate is collected by suction filtration. The moist product is suspended in 250 parts of water; then 40 ml. of 36% hydrochloric acid are added. A solution results initially, from which the 1-ethyl-3-aminocarbonyl-4-methyl-5-chloro-6-hydroxy-pyridone-2 precipitates in the form of crystals. The product is filtered and rinsed with 150 parts of 2 N hydrochloric acid. It can then be used directly for coupling in weakly alkaline medium without previous saponification of the aminocarbonyl group.

The corresponding chlorinated products in the 5-position can be obtained in similar manner from 1-phenyl-, 1-methyl-, 1-isopropyl- or 1-benzyl - 3 - aminocarbonyl-4-methyl-6-hydroxy-pyridone-2.

EXAMPLE 4

41.7 parts of 1,4 - dimethyl-6-hydroxy-pyridone-2 are suspended to 1000 parts by volume of water. 200 parts by volume of 36% hydrochloric acid are added and to the resulting broth of the pyridone chlorohydrate are added dropwise 48 parts of bromine at 0° C. within 1 hour. The pyridone chlorohydrate passes into solution at the same time and towards the end of the addition, 1,4-dimethyl-3-bromo-6-hydroxy-pyridone precipitates. The precipitate is filtered and washed free of acid with water.

In like manner, the 1-(2'-aminoethyl) - 3 - bromo-4-methyl-6-hydroxy-pyridone-2 is obtained from 1 - (2'-aminoethyl)-4-methyl-6-hydroxy-pyridone-2.

EXAMPLE 5

15.1 parts of 1 - ethyl-4-methyl-6-hydroxy-pyridone-2 are dissolved in 200 parts of glacial acetic acid. 13.5 parts of sulphuryl chloride are then added dropwise within 30 minutes at 20° C. to 25° C. and stirring is subsequently continued for 12 hours at room temperature. The reaction mixture is poured onto 500 parts of ice water and the crystalline precipitate that has formed is filtered with suction. The isolated product is identical with the 1-ethyl-3-chloro-4-methyl-6-hydroxy-pyridone-2 obtained according to the data of Example 1.

EXAMPLE 6

A solution of 18.5 parts of cyanuric chloride in 50 parts of acetone is added to a neutral solution of 26.8 parts of 1,3-diaminobenzene-4,6-disulphonic acid in 50° parts of water having a temperature of 0° C. to 5° C., and the pH is maintained between 6 and 7 during the condensation by dropwise addition of 2 N sodium hydroxide solution. Upon completion of the condensation, the resulting mono-condensation product is diazotised at 0° C. to 5° C. in the usual way. A neutral solution of 18.7 parts of 1-ethyl-6-hydroxy-3-chloro-4-methyl-pyridone-(2) is then added to the solution of the diazonium salt. By addition of 2 N sodium hydroxide solution the coupling mixture is adjusted to pH 7 in the course of 1 hour. The solution of the dichlorotriazine dyestuff is then treated with a neutral solution of 17.3 parts of 1-aminobenzene-3-sulphonic acid and heated to 40° C. to 45° C., the pH being maintained between 6 and 7 by dropwise addition of 2 N sodium hydroxide solution. By scattering in sodium chloride the resulting dyestuff is isolated, filtered off and dried. The product dyes cotton in very pure yellow shades.

A similar dyestuff is also obtained if the primary mono-condensation product from 1,3-diaminobenzene-4,6-disulphonic acid and cyanuric chloride is condensed firstly with 1-aminobenzene-3-sulphonic acid, diazotised and subsequently coupled to 1-ethyl-6-hydroxy-3-chloro-4-methyl-pyridone-(2).

What we claim is:
1. A compound of the formula

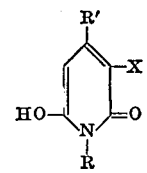

wherein R is hydrogen, lower alkyl, amino-substituted lower alkyl, phenyl, or benzyl, R' is hydrogen or lower alkyl, and X is halogen.

2. A compound of claim 1, wherein X is chlorine or bromine.

3. A compound of claim 2 wherein R is hydrogen, methyl, or ethyl, and R' is methyl.

4. A compound of claim 1 of the formula
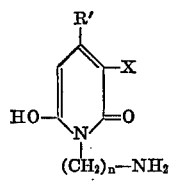
wherein R' is hydrogen or lower alkyl, $n$ is an integer of 1 to 4, and X is chlorine or bromine.
5. A compound according to claim 4 in which R' is methyl and $n$ is 2.
References Cited
UNITED STATES PATENTS
3,637,722  1/1972  Wang et al. _____ 260—297 Z
3,657,214  4/1972  Berrie et al. _____ 260—296 R
ALAN L. ROTMAN, Primary Examiner
U.S. Cl. X.R.
260—156, 294.8 F, 294.9, 295 R, 297 Z